United States Patent Office 2,898,228

Patented Aug. 4, 1959

2,898,228

METHOD FOR COATING POLYFLUORO-ETHYLENES

Frank M. Kelley, Simsbury, Conn., assignor to E. I. du Pont de Nemours and Company, Wilmington, Del., a corporation of Delaware No Drawing. Application February 18, 1957
Serial No. 640,582

6 Claims. (Cl. 117—47)

The present invention relates to a process for coating fluorinated polymers with thin continuous films of metal.

Polymers of fluorinated ethylenes such as polytetrafluoroethylene, polychlorotrifluoroethylene and copolymers of tetrafluoroethylene with fluorinated olefins are highly useful dielectric materials which find wide application in the electrical and electronic industry. In addition to their electrical properties the fluorinated ethylene polymers are extremely heat stable and corrosion resistant and thus are particularly suitable for electric insulation under adverse conditions. Another property of the polyfluoroethylenes, and particularly polytetrafluoroethylene, is their extremely low adhesion to other materials. This property is a disadvantage in the preparation of articles requiring a metallized surface such as is used in printed circuits. Adhesives used in bonding metal to polyfluoroethylene are expensive, difficult and time consuming to apply, and generally do not have the outstanding properties of the substrate, thus making it difficult to employ the polyfluoroethylenes with respect to the properties for which they are preferred. The direct coating of metals on polytetrafluoroethylene has been done heretofore by employing an unsintered, preformed article on which the metal is deposited and which is thereafter sintered. The disadvantages of this method are the weakness of the preform, and the resulting difficulty of applying the metal, and the sintering step which may cause oxidation of the metal, and distortion of the polymer which is contracting and expanding during the sintering process, thus causing the breaking of the continuous metal film.

It is, therefore, an object of the present invention to coat polyfluoroethylene surfaces with metals. It is a further object to prepare adherent, continuous coatings of metal on polyfluoroethylene surfaces. Another object of the present invention is to apply the coatings to the finished article needing no further fabrication. Yet another object is to prepare metal coated polyfluoroethylene surfaces which will conduct electricity with a minimum of resistance. Other objects will become apparent hereinafter.

The objects of the present invention are accomplished by a process which comprises contacting the surface of the polyfluoroethylene to the coated with a solution of an alkali metal in a non-metallic solvent capable of wetting the polyfluoroethylene and thereafter depositing metal in finely divided form on the surface to be coated. It was discovered that adhesive, continuous coatings of metals can be obtained on polyfluoroethylene surfaces without the use of bonding agents by treating the surface with a solution of an alkali metal such as a solution of sodium in liquid ammonia. The resulting surface is extremely adhesive to metals and metals deposited on the surface in colloidal form will form thin, strongly adherent films. In contrast to colloidal metal deposited on untreated surfaces of a polyfluoroethylene such as polytetrafluoroethylene, the metal film cannot be removed from the surface of treated materials by adhesive tapes such as "Scotch" cellophane tape.

The adhesive surface on polyfluoroethylenes is obtained, as stated hereinabove, treating the polymer surface with a solution of an alkali metal in a non-metallic solvent capable of wetting the polyfluoroethylene. The exact chemical structure of the resulting dark colored adhesive surface has not been definitely identified, but it is known that the surface contains no metal and does not conduct electricity and cannot be removed by chemical means without destruction of the polymer. The solvents employed in this process are solvents which will wet the polymer and are capable of maintaining the alkali metal in solution and which do not react chemically with the alkali metal to liberate hydrogen. The preferred and most readily available solvent is liquid ammonia. It is preferred because it forms very stable solutions of the alkali metal which rapidly react with the polymer to give rise to the adhesive surfaces. Other suitable solvents are low molecular amines and pyridine. Of the alkali metals, the sodium is preferred because of its low cost and and availability, but other alkali metals such as lithium are equally useful. It is further possible to employ solutions of alkaline earth metals such as calcium or magnesium, however, the reactivity of such solution is considerably lower. The concentration of the alkali metal in the solvent is of a minor significance, in general a 1% solution is employed although higher or lower concentrations react equally well. The quantity of solution required and the length of time required for the adhesive surface to form will vary with the size of the surface to be coated, the concentration of the solution employed, and the type of fluoroethylene polymer employed. The optimum conditions can, however, readily be determined by small scale tests. On contact with the solution, the polyfluoroethylene surface darkens and rapidly assumes a dark brown color. It was found that a uniform dark brown surface will give maximum adhesion to metal. If the material is kept in contact with the solution too long, a black surface results which is less adhesive. However, such an over-treated surface can be improved by washing with a strong oxidizing agent such as nitric acid. In general, a strongly adhesive surface is obtained if the surface to be coated is wetted with a 1% solution of sodium in ammonia for about 10–30 seconds and then washed free of the treating solution.

The treated surface will adhere to all metals generally employed for coating purposes if the metal is deposited in finely divided, colloidal form. Such metals are aluminum, copper, silver, chromium, nickel, germanium, tin, and similar conducting metals. Various techniques may be employed to deposit the metal on the treated surface of the polyfluoroethylene and include such techniques as vacuum metal coating or chemical reduction of a metal salt solution to the metal.

It was found that highly adherent continuous films having thicknesses ranging from 0.1 to 0.5 micron could be obtained by these metal coating techniques employing treated polyfluoroethylene surfaces. As in the coating of other plastics with metals the surface to be coated should be carefully cleaned prior to the actual coating.

The polyfluoroethylenes employed in the present invention are polymers obtained from fluorinated ethylenes and copolymers of fluorinated ethylene with ethylenically unsaturated monomers. Examples of such polymers and copolymers are polytetrafluoroethylene, polychlorotrifluoroethylene, polyvinylidenefluoride and copolymers of tetrafluoroethylene with chlorotrifluoroethylene tetrafluoroethylene with hexafluoropropylene and similar monomers. In general, the adhesiveness of the treated surface increases with the fluorine content of the polymer, thus polytetrafluoroethylene will give the most adhesive surface. Good results are generally obtained with polymers in which at least 50% of the carbon bonds other than carbon-to-carbon bonds are carbon-to-fluorine bonds.

The invention is further illustrated by the following examples:

*Example I*

A sample of a 30 mil thick sheet of polytetrafluoroethylene measuring 1" by 2" was immersed in a 1% solution of sodium in ammonia for a period of 30 seconds. The treated piece was washed with water and acetone and then dried. The treated polytetrafluoroethylene was then suspended in 30 ml. of an aqueous ammoniacal silver nitrate solution (Tollen's reagent) containing 3 g. of silver nitrate. To this solution was then added 5 ml. of a 37% solution of formaldehyde. Within a short time, a silver mirror had formed on the treated surface. The silver plated polytetrafluoroethylene was rinsed with water and dried. The surface was coated with a continuous layer of silver having a thickness of 0.2 micron. The conductivity of the coated metal approached that of the pure metal surface.

To test the adhesion of the metallized surface, pressure-sensitive "Scotch" cellophane tape was pressed on the metallized surface and then rapidly removed. Insignificant amounts of the silver adhered to the tape on removal. The resistivity of the metal coating remained the same. The silver coating process was repeated with an untreated piece of polytetrafluoroethylene; no continuous coating could be obtained, the adhesion of the silver to the polymer surface being extremely poor.

*Example II*

Samples of polytetrafluoroethylene sheet were treated with a sodium solution in liquid ammonia as described in Example I. The film was then placed in a vacuum chamber having therein a tungsten filament in the form of a basket containing 3 g. of aluminum at a distance of 10 cm. from the metal basket. The chamber was evacuated to a pressure of $5\times10^{-5}$ mm. of mercury. Electric current was applied to the tungsten filament until the aluminum in the basket had melted and vaporized. An aluminum coating of 0.3 micron was obtained within 2 minutes. The coating was continuous and adherent and could not be removed by the "Scotch" tape test. The low resistivity of the coating remained unchanged by the "Scotch" tape test.

The example was repeated employing silver, copper, and germanium. Adherent, continuous coatings were obtained in each case.

*Example III*

A sample of a copolymer of tetrafluoroethylene and hexafluoropropylene, ½" x 2" x 0.1", was immersed in a 1% solution of sodium in liquid ammonia for a period of 30 seconds. The piece treated in this way was washed with water and acetone and then dried in air. The sample was then placed in a vacuum chamber at a distance of 10 cm. from a tungsten filament shaped in the form of a conical basket and containing 200 mg. of germanium. The chamber was evacuated to a pressure of $5\times10^{-5}$ mm. of mercury. The tungsten filament was heated with an electric current, whereupon the germanium in the basket melted and vaporized. A germanium coating 0.5 micron thick was obtained within 10 seconds. The coating was continuous and adherent and could not be removed by the "Scotch" tape test.

Similar results were obtained with chromium and tin.

*Example IV*

A sample of polychlorotrifluoroethylene was treated with a solution of sodium in liquid ammonia as described in Example III. The sample was placed in a vacuum chamber and coated with germanium by evaporation as described in Example III. A continuous and adherent coating 0.3 micron thick which could not be removed by the "Scotch" tape test was obtained within 10 seconds.

The example was repeated using chromium and tin. Adherent, continuous coatings were obtained in each instance.

The process of the present invention is equally well applicable to sintered or unsintered polymer surfaces; it is applicable to injection molded, melt extruded or compression molded pieces. The process may further be applied to polyfluoroethylene articles of varied sizes and shapes such as solid articles, thin films or even fibers. As stated hereinabove, the coatings are continuous, strongly-adherent and flexible.

The metal coated polyfluoroethylene prepared by the process of the present invention have a wide range of applications as final products or as intermediates. Thus the coating process may be employed for coating polyfluoroethylene insulated wires to provide means for equalizing the electrical stresses occurring across insulating layers. The coating process is extremely suitable for the preparation of printed and inlaid circuits. Printed circuits are prepared by coating the polymer surface with a material such as paraffin, cutting the circuit into the wax and then subjecting the polymer to the process of the present invention and then removing the paraffin; this leaves only the circuit desired metallized. Other applications involve the use of metallized polyfluoroethylene surfaces as electrodes, in capacitors and in condensers. The metal coated surfaces may be employed for further electroplating. Solder may be directly fused to the coating and conductors may be soldered to the coating. Many other applications will occur to those skilled in the art.

I claim:

1. A method of coating polyfluoroethylene surfaces, said polyfluorethylene being a member of the class consisting of polymers of tetrafluoroethylene and chlorotrifluoroethylene and copolymers of tetrafluoroethylene and hexafluoropropylene, which comprises contacting the polyfluoroethylene surface to be coated with a solution of an alkali metal in a non-metallic inert solvent capable of wetting the polyfluoroethylene, recovering a non-metallic treated surface, and thereafter depositing on said treated surface a metal selected from the class consisting of aluminum, copper, silver, tin, chromium and germanium, said metal being deposited in colloidal form.

2. A method of coating polytetrafluoroethylene surfaces with a continuous film of metal which comprises contacting the polytetrafluoroethylene surface to be coated with a solution of an alkali metal in a non-metallic, inert solvent capable of wetting the polytetrafluoroethylene, recovering a non-metallic treated surface, and thereafter depositing on said treated surface a metal selected from the class consisting of aluminum, copper, silver, tin, chromium and germanium, said metal being deposited in colloidal form.

3. The method as set forth in claim 2 wherein the solution of an alkali metal is a solution of sodium in liquid ammonia.

4. The method as set forth in claim 2 wherein the deposition of the colloidal metal is obtained by reduction of a dissolved metal salt.

5. The method as set forth in claim 2 wherein the deposition of the colloidal metal is obtained by vaporization and condensation of the metal in a vacuum.

6. The article obtained by the method set forth in claim 2.

References Cited in the file of this patent

UNITED STATES PATENTS

| | | |
|---|---|---|
| 2,689,805 | Croze et al. | Sept. 21, 1954 |
| 2,789,063 | Purvis et al. | Apr. 16, 1957 |

UNITED STATES PATENT OFFICE
CERTIFICATE OF CORRECTION

August 4, 1959

Patent No. 2,898,228

Frank M. Kelley

It is hereby certified that error appears in the printed specification of the above numbered patent requiring correction and that the said Letters Patent should read as corrected below.

Column 1, line 58, for "to the coated" read -- to be coated --; column 2, line 4, before "treating" insert -- by --.

Signed and sealed this 26th day of January 1960.

(SEAL)
Attest:

KARL H. AXLINE
Attesting Officer

ROBERT C. WATSON
Commissioner of Patents